(12) United States Patent
Castonguay et al.

(10) Patent No.: US 12,437,014 B2
(45) Date of Patent: Oct. 7, 2025

(54) PROACTIVE MULTI-MODAL AUTOMOTIVE CONCIERGE

(71) Applicant: Cerence Operating Company, Burlington, MA (US)

(72) Inventors: Evans Castonguay, Montreal (CA); Balakrishna Venkata Jagannadha Kolluru, Austin, TX (US); Christian Benien, Aachen (DE); William Bille, Montreal (CA); Iqbal Arshad, South Barrington, IL (US); Ricky Hoobler, Waltham, MA (US)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 18/915,764

(22) Filed: Oct. 15, 2024

(65) Prior Publication Data

US 2025/0124091 A1    Apr. 17, 2025

Related U.S. Application Data

(60) Provisional application No. 63/543,868, filed on Oct. 12, 2023, provisional application No. 63/685,291, (Continued)

(51) Int. Cl.
*G06F 16/9535* (2019.01)
*B60K 35/10* (2024.01)
(Continued)

(52) U.S. Cl.
CPC .......... *G06F 16/9535* (2019.01); *B60K 35/10* (2024.01); *B60K 35/22* (2024.01);
(Continued)

(58) Field of Classification Search
CPC ..... G06F 16/9535; B60K 35/10; B60K 35/22; B60K 35/265; B60K 2360/164; B60K 2360/1438
See application file for complete search history.

(56) References Cited

U.S. PATENT DOCUMENTS

| 10,730,457 B1* | 8/2020 | Smith | G08G 1/096783 |
| 2013/0038437 A1* | 2/2013 | Talati | B60K 35/10 340/438 |

(Continued)

FOREIGN PATENT DOCUMENTS

| DE | 102018200431 A1 | 7/2019 |
| DE | 102022201288 A1 | 8/2023 |

*Primary Examiner* — Kris E Mackes
(74) *Attorney, Agent, or Firm* — Brooks Kushman, P.C.

(57) ABSTRACT

An apparatus for providing information services to a user in a vehicle includes an automotive concierge, a prompter, and an interaction mode. The automotive concierge is hosted by an infotainment system in the vehicle and engages in an interaction with the user based on context. The prompter generates a prompt for a model in response to an instruction from the automotive concierge, the instruction being based on the context information and the prompt being selected to cause the model to generate content that invites a choice from the user. The interaction mode delivers the content to the user and provides information from the user to the automotive concierge.

19 Claims, 11 Drawing Sheets

Related U.S. Application Data filed on Aug. 21, 2024, provisional application No. 63/703,238, filed on Oct. 4, 2024, provisional application No. 63/706,114, filed on Oct. 11, 2024, provisional application No. 63/706,118, filed on Oct. 11, 2024.

(51) Int. Cl.
*B60K 35/22* (2024.01)
*B60K 35/26* (2024.01)

(52) U.S. Cl.
CPC .... *B60K 35/265* (2024.01); *B60K 2360/1438* (2024.01); *B60K 2360/164* (2024.01)

(56) References Cited

U.S. PATENT DOCUMENTS

| | | | |
|---|---|---|---|
| 2014/0028542 A1* | 1/2014 | Lovitt | G06F 3/017 |
| | | | 345/156 |
| 2020/0300655 A1* | 9/2020 | Masuo | G06Q 20/123 |
| 2022/0126864 A1 | 4/2022 | Moustafa et al. | |
| 2023/0278579 A1 | 9/2023 | Kim et al. | |
| 2024/0087561 A1* | 3/2024 | Pathak | G06F 3/013 |
| 2024/0095460 A1* | 3/2024 | Xu | G06F 40/30 |

* cited by examiner

```
{"thought": "The user's query is to find and send the
           current price of neutronium to Septimus
           Selden. I lack the ability to directly send a
           message. Therefore, I first need to find the
           current price of neutronium using the
           "commodities" tool. I then have to construct a
           message with that information using the
           "contacts" tool.                              116

"action": "commodities"
"action input":
}
120
```

```
121 ─┐ {
       "observation": Today's price for neutronium is
                     $58.56 per milligram. The message to
                     be sent to Septimus is, "The current
                     price of neutronium is $58.65 per
                     milligram.

118 ─┐ "action": "contacts",
120 ─┐ "action input": "Send the message 'The current price for
                       neutronium is $58.65 per milligram' to
                       Septimus.

PROACTIVE MULTI-MODAL AUTOMOTIVE CONCIERGE

RELATED APPLICATIONS

This application claims the benefit of the Oct. 12, 2023 priority date of U.S. Provisional Application 63/543,868. This application also claims the benefit of the Aug. 21, 2024 priority of U.S. Provisional Application 63/685,291, as well as the Oct. 4, 2024 priority date of U.S. Provisional Application 63/703,238 and the Oct. 11, 2024 priority date of U.S. Provisional Application 63/706,114 and U.S. Provisional Application 63/706,118, the contents of all of which are herein incorporated by reference.

BACKGROUND

The invention relates to automotive electronics and in particular to electronic devices for communicating a message to a proper subset of a vehicle's population.

In a modern vehicle, it is not uncommon to have an infotainment system that hosts an automotive assistant. The automotive assistant provides various information services to an occupant of the vehicle.

An automotive assistant responds to communication from an occupant but generally does not initiate such communications. Moreover, an automotive assistant typically communicates by speech. This is particularly convenient for a driver who is expected to be looking at the vehicle's environment rather than reading messages on a screen. This reduces driver distraction.

SUMMARY

In one aspect, the invention features an apparatus for providing information services to a user in a vehicle. Such an apparatus includes an infotainment system mounted within the vehicle, a context source in communication with the infotainment system, an automotive concierge that is hosted by the infotainment system, a prompter that generates a prompt for a model in response to an instruction from the automotive concierge, the instruction being based on the context and the prompt being selected to cause the model to generate content that invites a choice from the user, the model being a language model, and an interaction mode for delivering the content to the user and for providing information from the user to the automotive concierge. The automotive concierge engages in an interaction with the user based on context from the context source.

Embodiments further include those having a mode selector. Among these are those in which the mode selector selects the inbound channel and the outbound channel in response to a selection signal from the automotive concierge, the selection signal being based on the context, those in which the mode selector switches between first and second modes in response to the context, wherein each of the modes comprises an inbound channel and an outbound channel, wherein, in the first mode, the inbound channel and the outbound channel are both audio channels, and wherein, in the second mode, at most one of the inbound and outbound channels is an audio channel, and those in which the mode selector switches between first and second modes in response to the context, wherein each of the modes comprises an inbound channel and an outbound channel, wherein, in the first mode, the inbound channel and the outbound channel are both audio channels, and wherein, in the second mode, the inbound and outbound modes are both non-audio channels. an audio channel.

Also among the embodiments that include a mode selector that switches between first and second modes in response to the context, wherein each of the modes comprises an inbound channel and an outbound channel, wherein, in the second mode, the inbound channel comprises a touch-screen interface having a selection identified by content from the model and those in which the mode selector that switches between first and second modes in response to the context, wherein each of the modes comprises an inbound channel and an outbound channel, wherein, in the first mode, the outbound channel is selected to provide spoken information to the user and also to provide text to the user via a display, the text having been generated by the model.

Still other embodiments include a mode selector that that transitions between a first interaction mode to an interaction mode selected from the group consisting of a second interaction mode and a third interaction mode in response to the context, wherein the first, second, and third interaction modes are selected from the group consisting of an audio mode, a non-audio mode, a hybrid mode, a privacy mode, and a silent mode.

In some embodiments, the context comprises information indicative of a message for the user. In such embodiments, the automotive concierge causes the prompter to prompt the model to generate a summary of the message for delivery to the user.

Among the embodiments are those in which the context comprises information indicative of first and second messages for the user and preference information that indicates that the first message has higher priority than the second message. In these embodiments, the automotive concierge delivers the first message prior to the second message based on the preference information.

Still other embodiments include those in which the context comprises one or more of: occupancy information, message information, location information, traffic information, driver information, vehicle information, preference information, and environmental information.

Also among the embodiments are those in which the automotive concierge is configured to change the interaction mode based on presence of an additional occupant in the vehicle, the additional occupant being in addition to the user.

In still other embodiments, the interaction mode is a current interaction mode selected from among a plurality of interaction modes, the plurality of interaction modes including a first interaction mode and a second interaction mode. In such embodiments, the current interaction mode is the first interaction mode, and the automotive concierge is configured to cause the current interaction mode to become the second interaction mode in response to a change in the context.

Embodiments further include those in which the context comprises driver information and vehicle information. In some of these embodiments, in response to the context, the automotive concierge identifies a location having facilities for modifying a state of the driver and a state of the vehicle.

In still other embodiments, the context comprises driver information indicative of a state of the driver. In these embodiments, based on the driver information, the automotive concierge proposes an interaction to promote a change in the state of the driver, the interaction comprising a cognitive stimulus.

These and other features of the invention will be apparent from the following detailed description and the accompanying figures, in which:

DESCRIPTION OF DRAWINGS

FIG. 6 shows an output of the top-level model shown in FIG. 5 after having interacted with a first domain-specific delegee;

FIG. 7 shows an output of the top-level model shown in FIG. 5 after having interacted with a second domain-specific delegee;

DETAILED DESCRIPTION

Figure 1:
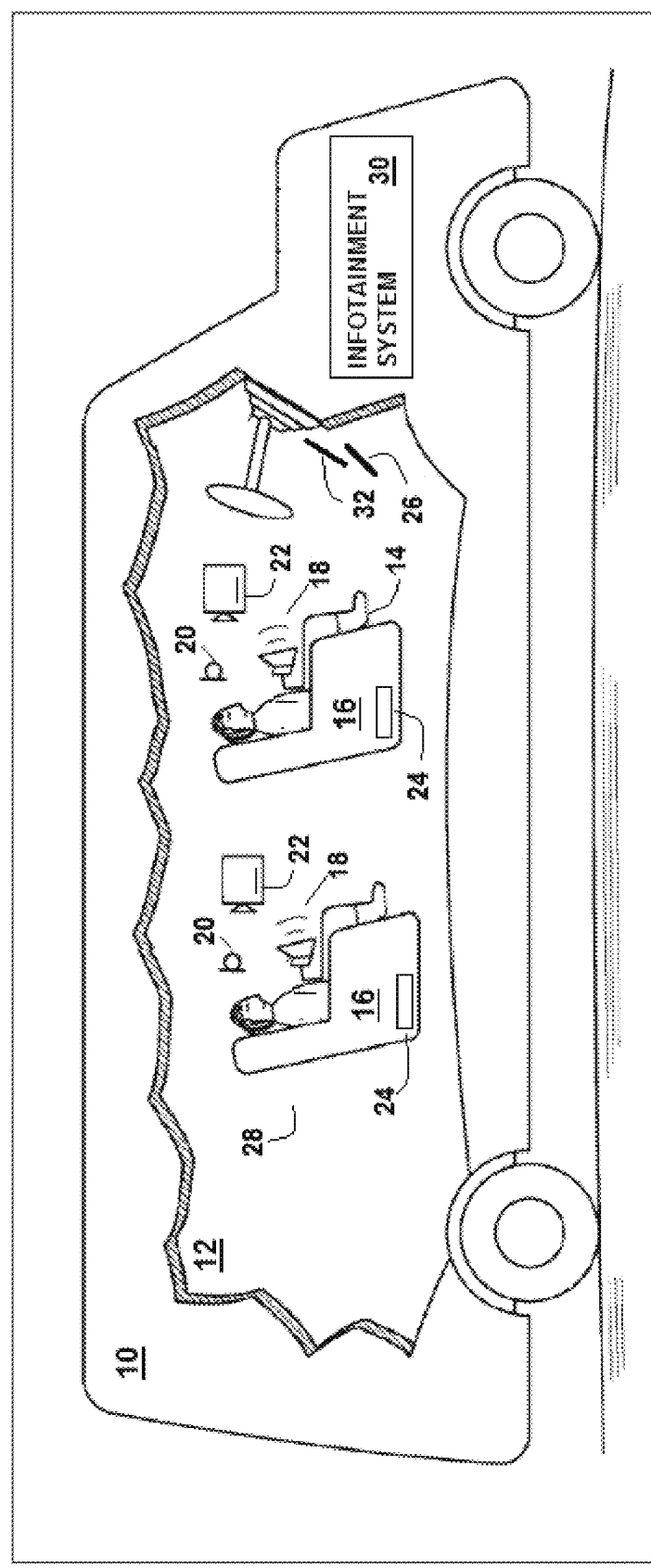
FIG. 1 shows a vehicle having an infotainment system having a message interceptor that intercepts incoming messages.

FIG. 1 shows a vehicle 10 having a passenger cabin 12 in which a user 14, along with perhaps one or more additional vehicle occupants, sit in a seat 16.

Each seat 16 has an associated loudspeaker 18, a microphone 20, a camera 22, a mass sensor 24, and a touch interface 26. The microphones 20, cameras 22, the mass sensors 24, and the touch interfaces 26 are constituents of a sensor set 28.

The vehicle 10 further includes an infotainment system 30 that receives inputs from the sensor set 28 and that provides audible outputs through the loudspeakers 18 and/or visual outputs through at least one display 32.

Figure 2:
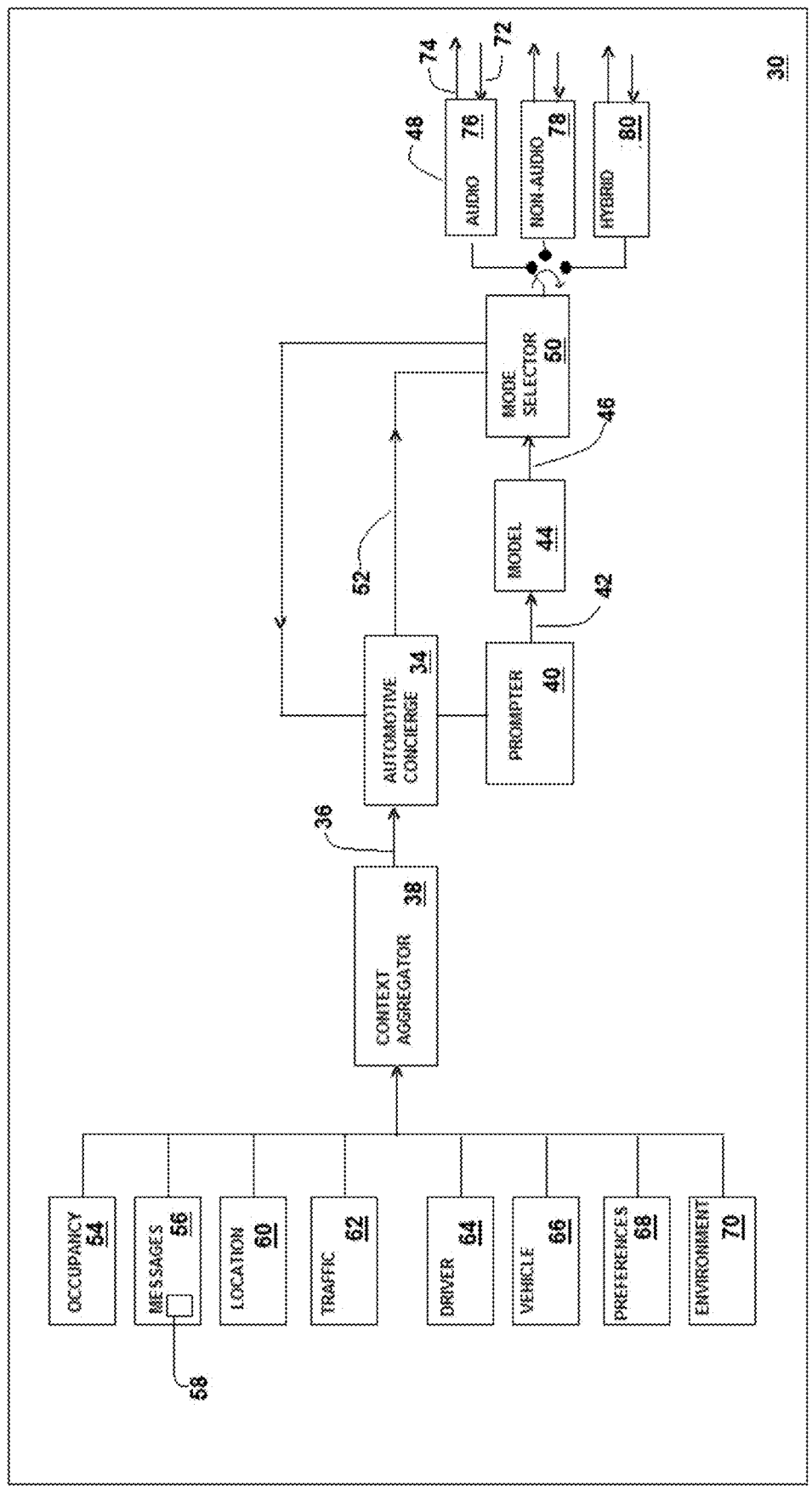
FIG. 2 shows details of the message interceptor of FIG. 1.

Referring now to FIG. 2, the infotainment system 30 includes an automotive concierge 34 that engages in an interaction with the user 14. The interaction includes a dialog with the user 14. In the course of the dialog, the automotive concierge 34 receives context 36 from an aggregator 38 and uses that context 36 as a basis for controlling a prompter 40 that generates a prompt 42 for a model 44. As used herein, a "model" is a "large language model."

In response to such a prompt 42, the model 44 outputs content 46 that is to be communicated to the user 14 using one of several interaction modes 48. A mode selector 50 selects from among the interaction modes 48 based on a mode-selection switch 52 received from the automotive concierge 34. The setting on the mode-selection switch 52 depends in part on context 36 acquired from the aggregator 38.

The aggregator 38 aggregates several different kinds of context 36. These include: occupancy information 54, which is derived from signals from the sensor set 28, and in particular from the cameras 22 and the mass sensors 24, and which indicates how many occupants are in the vehicle 10, where they are seated, and, in some cases, who they are; message information 56, which includes messages 58 to be relayed to the user 14, including such information as who sent the message 58, who else received the message 58, and the content of the message 58, all of which provide useful context 36 for use by the automotive concierge 34; location information 60, such as that obtains from a geo-positioning system; traffic information 62, which is typically provided by a remote traffic server; driver-state information 64, which is obtained from observations made by the camera and microphone, vehicle information 66, such as fuel supply, tire pressure, and other information derived from sensors internal to the vehicle 10; preference information 68, some of which is stored as user preferences stored by individual users either locally or remotely and some of which is acquired through observation of user activity and patterns of behavior, including observation of user activity through which a user communicates user intent, either express or implied; and environment information 70, which includes temperature, precipitation, atmospheric conditions, ambient lighting, and similar information concerning the vehicle's operating environment as well as information concerning nearby points-of-interest.

Each interaction mode 48 includes an inbound channel 72 and an outbound channel 74. The automotive concierge uses the inbound channel 72 to receive information from an occupant 10 and the outbound channel 74 to provide information to the user 14. As shown in the figure, the inbound channel 72 passes through the mode selector 50 towards the automotive concierge 34.

The interaction modes 48 differ from each other based on the modes used for the inbound channel 72 and the outbound channel 74.

In the illustrated embodiment, there are three types of interaction mode 48: audio mode 76, non-audio mode 78, and hybrid mode 80.

In the audio mode 76, both the inbound channel 72 and the outbound channel 74 are audio channels. This is a useful default interaction mode 48.

In the non-audio mode 78, neither the inbound channel 72 nor the outbound channel 74 are audio channels. This mode provides greater privacy since other occupants in the vehicle 10 would find it more difficult to eavesdrop on the interaction.

In the hybrid mode 80, one of the inbound channel 72 and outbound channel 74 is audio and the other is not audio. An example of a non-audio inbound channel 72 is one that has the touch sensor 26 at a terminus thereof. An example of a non-audio outbound channel 74 is one having the display 32 at a terminus thereof. One example of a hybrid mode 80 is that in which the outbound channel 74 is suppressed. This is referred to as "silent mode."

Based on context 36, the automotive concierge 34 may determine that privacy is important and thus use a mode in which one or both channels is non-audio.

Having introduced the structures shown in FIG. 2, it is useful to consider some examples of their operation in specific use cases.

In one example, the automotive concierge 34 receives context 36 that includes occupancy information 34 and message information 56. The message information 56 indicates that the user 14 has several messages 58 waiting.

The automotive concierge 34 takes it upon itself to proactively draw attention to the waiting messages 58 and to suggest an action, for example:

"Good morning Mr. Phelps, you have a voice message from Mrs. Phelps, a text message from the agency, and two text messages from unknown parties. Some of these may be fraudulent. Would you like to hear Mrs. Phelps' message first?"

In this example, the automotive concierge 34 has used occupancy information 54 to identify the user 14. Having done so, it then accessed the preference information 68 to determine how to prioritize messages for the identified user 14. This enables the automotive concierge 34 to engage in a bespoke interaction with that user 14.

In this case, the automotive concierge 34 has discovered, from the preference information 68, that the user 14 habitually listens to messages from Mrs. Phelps before any other messages. Not surprisingly, the user 14 replies to the automotive concierge 34 in a manner consistent with his observed habits:

"Yes, please tell me what Sandra has to say."

The message, like many voice messages, is peppered with filler words, repetitions, pauses, and similar features that are characteristic of extemporaneous speech. Having recognized that these features exist, the automotive concierge 34 provides the prompter 40 with both the message 58 and an instruction to summarize the message 58 prior to delivery via the outbound channel 74.

In response, the prompter 40 generates a suitable prompt 42 and provides it, along with the message 58 to be summarized, to the model 44. The model 44 then generates content 46 that summarizes the message 58 into a form that retains the content but also delivers it more fluently. An example of such a summary is of the form:

"Sandra says that the refrigerator has been emptied and suggests dinner at a French restaurant. Shall I make reservations?"

As is again apparent from the foregoing utterance, the automotive concierge 34 is configured to do more than simply wait for instructions on what to do next. In this case, drawing upon message information 56, including message content, the automotive concierge 34 has suggested an action to be taken.

Upon receiving the user's assent to the action, the automotive concierge 34 retrieves location information 60 and environmental information 70 from the context aggregator 38. Together, these reveal the presence of nearby restaurants. Accordingly, the automotive concierge 34 proposes a course of action:

"I found two French restaurants: 'Chez Fantine' and 'Le Soleil Bleu.' 'Chez Fantine' is the closest to your current location. Shall I guide you there?"

The automotive concierge 34, having been programmed for proactivity, has again offered a concrete suggestion to take action, a suggestion which the user 14 gladly accepts:

"Yes, that's a great idea. I forget where it is exactly."

Instead of passively following the user's instructions to the letter, the automotive concierge 34 disclosed herein proactively offers to go further:

"I'd be delighted to. In two miles, turn left on Macondo Boulevard. I can also make a reservation there if you wish and let Sandra know to meet you there."

Recognizing that the environmental information 70 indicates a fine evening ahead and that outdoor seating exists at the selected restaurant, the automotive concierge 34 adds:

"By the way, since the weather is good, shall I book an outdoor table?"

Because of the nature of his work at the agency and the suspicious nature of the two unidentified messages, the user 14 prefers not to be exposed to passers-by. As a result, he declines the option:

"No thank you. I prefer indoors."

Having been cued by the word "prefer," the automotive concierge 34 causes the preference information 68 to be updated to indicate that Mr. Phelps prefers indoor dining.

A few minutes later, after having made a reservation at "La Maison Fantine" and after also having shared the reservation information with Mrs. Phelps, the automotive concierge 34 draws upon traffic information 62 and location information 60 and utters:

"I have made a reservation and called Sandra. Your left turn onto Macondo Street is in half-a-mile. Traffic is light so we should arrive at the restaurant in ten minutes."

As the vehicle 10 approaches, the automotive concierge 34 recognizes its imminent arrival and proactively offers yet another suggestion:

"We are five minutes away. Would you like me to order your favorite beer so that it will be ready and waiting?"

In the course of the multiple rounds of dialog in the foregoing interaction, the automotive concierge 34 has drawn upon many different types of context 36, used the model 44 to provide a suitable summary of the message 58, and consistently guided the user 14 along a path that efficiently consummates the interaction. This differs from conventional digital assistants, that are more passive in nature.

A salient feature of the foregoing interaction was its use of the audio mode 76. While audio mode 76 is often convenient in a vehicle 10, there are circumstances in which it is advantageous to pause voice interactions and to conduct all or part of an interaction using a different interaction mode 48.

For example, traffic conditions or ambient noise may change to an extent in which speaking becomes too difficult. In such cases, the automotive concierge 34 sends a mode-selection signal 52 that causes the mode selector 50 to switch to a hybrid mode 80 that features an inbound channel 72 that terminates at the touch sensor 26 and an outbound channel 74 that terminates in the display 32. Alternatively, the user 14 can initiate a change in the interaction mode 48 via a spoken command. In yet other examples, the automotive concierge 34 determines, from the occupancy information 54, that a need for privacy precludes the use of the audio mode 76.

Since a change in interaction mode 48 is to some extent unpredictable, it is particularly useful for the automotive concierge 34 to display its most recent communication on the display 32 and to provides a menu of response options on the touch interface 26 for the user's selection. However, since the subject of the most recent communication is not predictable, the responses that would be displayed on the touch interface 26 cannot be pre-programmed. They must be generated dynamically.

To accommodate this difficulty, in parallel with providing a communication to the user 14, the automotive concierge 34 also causes the prompter 40 to compose a prompt 42 that will cause the model 44 to generate one or more action-oriented statements for display on the touch interface 26 for the user's selection subject. Both the limited space of the touch interface 26 and the user's limited attention conspire to limit the length of these action-oriented statements. As a result, the prompt 42 causes the model 44 to compose action-oriented statements that communicate the options that the automotive concierge 34 presents but that are concise.

The automotive concierge 34 also causes the model 44 to predict the most likely course of the conversation, thereby enabling it to provide tips to lead or guide the user 14 through the interaction. These tips, which are generated based on contextual logic, have the benefit of, in some cases, providing the user 14 with information about options that the user 14 whose existence the user may not have been aware of.

In some cases, the automotive concierge 34 initiates an interaction that does not involve communication with another person. In one illustrated example, the automotive concierge 34 receives, as context 36, vehicle information 66 indicating low fuel and location information 60 indicating no service stations for the next eighty miles. The automotive concierge 34 also receives driver-information 64 suggesting that the driver is experiencing an increasing level of drowsiness. In response to such context 36, the automotive concierge 34, recognizing from the vehicle information 66 that the vehicle 10 uses diesel fuel and that the user 14 is in need of a stimulant, draws upon environment information 70 to learn that an upcoming rest stop offers both diesel fuel and a variety of stimulant-laden beverages. Having done so, the automotive concierge 34 suggests:

"You seem a bit drowsy, and the fuel is low. The truck stop at the 'Dead Man's Gulch" exit has diesel and coffee. Perhaps you would like to stop? The next service station is eighty miles away."

Then, after setting out on the road again, the automotive concierge 34 continues to monitor context 36 that includes driver information 64. Upon detecting the user's lapse into drowsiness, and in recognition of the role that a greater cognitive load plays in maintaining alertness, the automotive concierge 34 attempts to entice the user 14 into a brief quiz. Accordingly, the automotive concierge 34 causes the model 44 to generate questions for a suitable quiz and delivers the following invitation:

"How about a quiz to kill some time on this long drive?"

Upon receiving the driver's assent, the model 44 begins providing questions that it has generated. When the first question is available, the automotive concierge 34 says, "Great. Let's start the quiz. Who scored the winning goal in the 2014 World Cup?"

In response to the driver's answer, "Michael Jordan," the automotive concierge 34 replies:

"Close! But Michael Jordan plays basketball. The correct answer is 'Mario Götze.' Here's your next question: who was the big star on the opposing team?"

Figure 3:
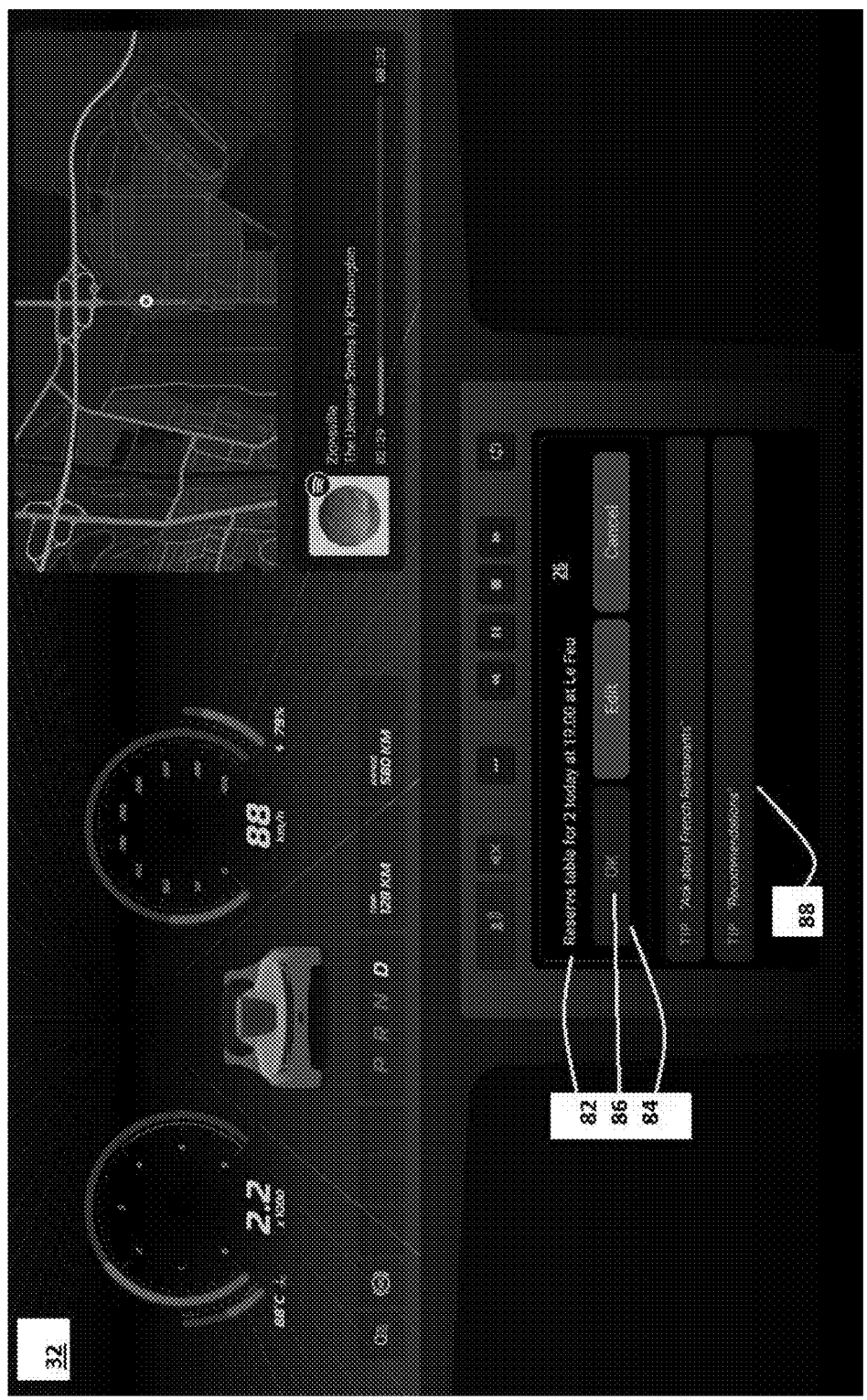
FIGS. 3 and 4 show the touch interface and display in two different states.

FIG. 3 shows the display 32 and the touch interface 26 following generation of by the model 44 of text 82 that summarizes a choice to be made by the occupant 14 together with three buttons 84 that invite the user to touch the touch interface 26 to make a choice. In a typical embodiment, the model 44 also generates button text 86 for the buttons 84 based on context and subject to the constraint that they must fit within the buttons 84. The touch interface 26 also displays certain dynamically-generated tips 88 that alert the occupant 14 to other capabilities of the automotive concierge 34. In some embodiments, the dynamically-generated tips 88 also function as buttons 82 that communicate the user's intent to the automotive concierge 34.

Figure 4:
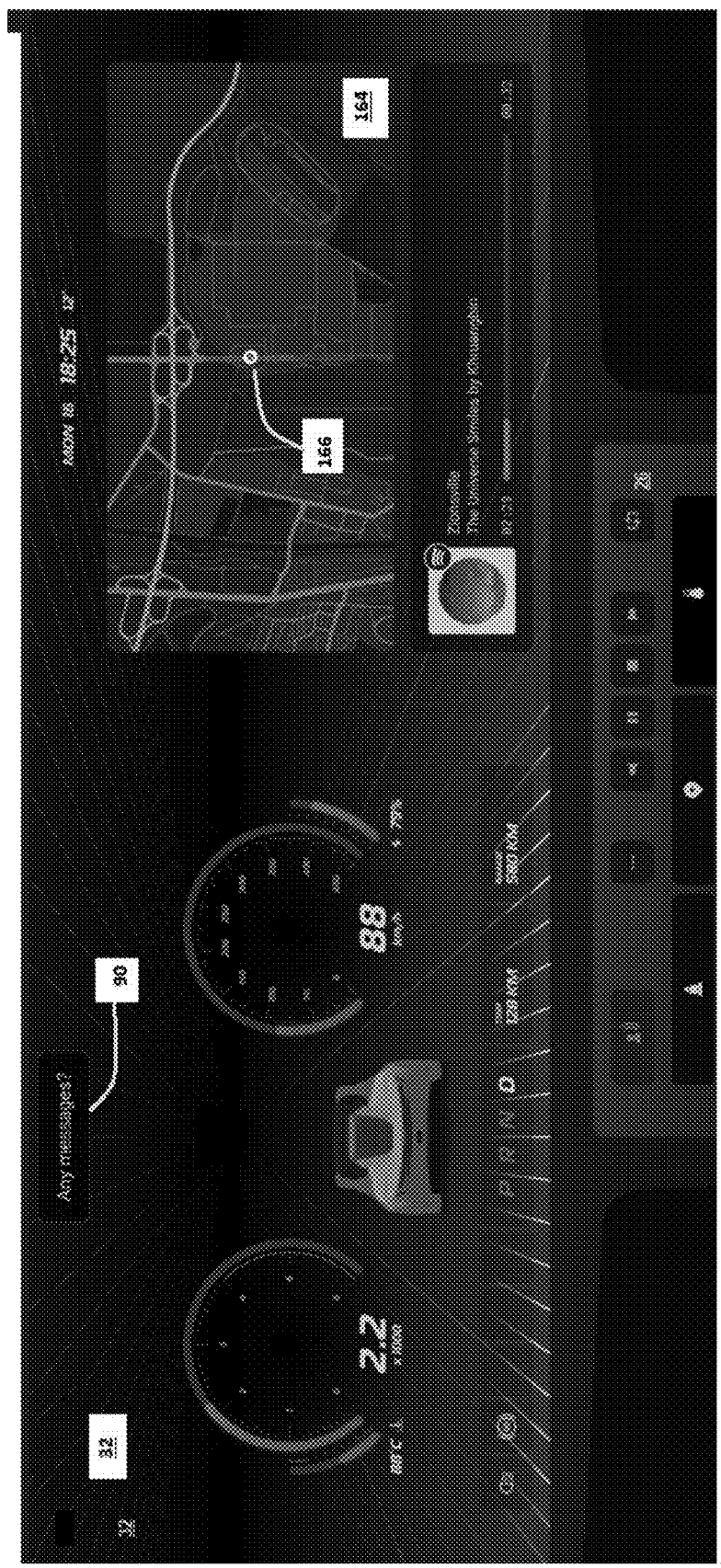

FIG. 4 shows the display 32 of FIG. 3 after having received an utterance from the occupant 14. In this case, the display 32 displays echo text 90 that shows the occupant's utterance as best understood by the automotive concierge 34.

The automotive concierge 34 as described herein thus makes use of different kinds of context 36 to proactively provide information services to the user in a way that prompts both the user by offering action-oriented statements and that prompts a model to provide suitable generated content that changes dynamically in response to changes in context.

Figure 5:
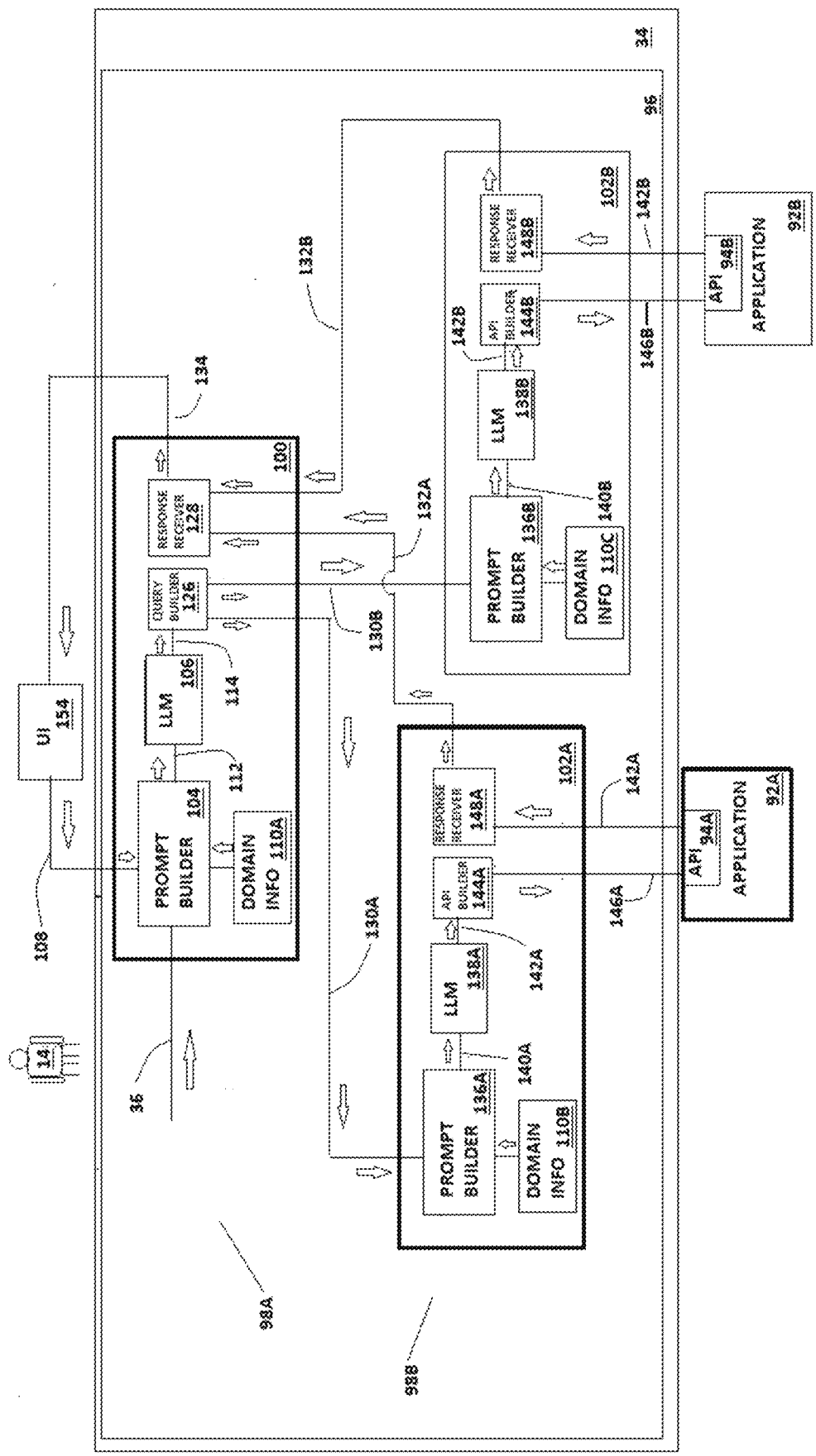
FIG. 5 shows a hierarchy within the automotive assistant of FIG. 1.

The multiple rounds of dialog described herein tend to require execution of specialized tasks using specialized sources of information. FIG. 5 shows one implementation of an architecture that promotes the case with which the automotive concierge 34 is able to execute these specialized tasks.

For example, the first example, the automotive concierge 34 refers to a recently-arrived text message. To retrieve the message and to then read it aloud would require that the automotive concierge 34 know how to manipulate messages. This would likely require that the automotive concierge 34 interface with software that handles messaging.

In another example described herein, the automotive concierge 34 has offered to make a reservation at a restaurant. However, the automotive assistant 34 would not necessarily know how to do this. And it would be impractical to program the automotive assistant 34 to do so, particularly given the variety of systems that exist and the fact that they change from time to time. Instead, the automotive concierge 34: identifies an external application 92A, 92B that knows how to make reservations, interacts with that external application 92A, 92B, and relays the result to the user 14, which in this case is Mr. Phelps.

A typical external application 92A, 92B interacts with other entities through its application-program interface 94A, 94B. Therefore, in order to interact with an external application 92A, 92B, the automotive concierge 34 uses that external application's application-program interface 94A, 94B. Each external application 92A, 92B in the external-application set 36 will have its own application-program interface 94A, 94B. This means that the automotive concierge 34 must somehow know how to interact with many different application-program interfaces 94A, 94B.

In those cases where the external-application set 36 has only a few external applications 92A, 92B, it is practical to construct an automotive concierge 34 that knows the relevant application-program interfaces 94A, 94B. However, as the number of external applications 92A, 92B increases, so too does the task of ensuring that the automotive concierge 34 will be able to use them all effectively. Moreover, the application-program interfaces 94A, 94B are not necessarily static. They are apt to change over time as developers of the external application 94A, 94B add or delete functions or as they make changes to existing functions. A technical problem to be solved is therefore that of casing the burden of ensuring that the automotive concierge 34 will be able to interact with an ever-changing panoply of application-program interfaces 94A, 94B.

FIG. 5 shows a hierarchy 96 upon which the automotive concierge 34 relies to interact with application-program interfaces 94A, 94B. The hierarchy 96 includes a first level 98A and a second level 98B. The first level comprises a top-level agent 100, which can be referred to as the "backbone" or "orchestrator" of the hierarchy 96. The second level 98B comprises domain-specific delegees 102A, 102B which can be referred to as "domain-specific actions" or "domain-specific tools."

In the illustrated embodiment, the first level 98A happens to be the top level of the hierarchy 96. However, the architecture shown in FIG. 5 is inherently recursive. Nothing prevents each domain-specific delegee 102A, 102B from playing the role of a first level 98A and having sub-domain-specific delegees under it.

Each domain-specific delegee 102A, 102B is configured to respond to prompts that are pertinent to a particular domain. Examples of a domain include: a navigation domain, a music domain, a general-knowledge domain, and a car-control domain. In general, a unit of text may have more than one meaning. To ascertain which of several meanings of text is to be applied, additional information is required. This additional information identifies a "domain." As an example, the term "lay down a track," when accompanied by information that a "music" domain is to be applied, would be interpreted to mean the act of recording music. In contrast, when accompanied by information that a "railroad" domain is to be applied, the same text would be interpreted to mean the act of laying down pairs of rails for use by a train. It is often useful to divide requests into domains so that a given set of words can be assigned to an appropriate meaning.

The top-level agent 100 comprises a top-level prompt-builder 104 and a top-level model 106.

In a preferred embodiment, the top-level model 106 is a large language model, hereafter referred to as a "model." A model, in this context, receives a textual input and provides an output consistent with its training. In some embodiments, the output of the top-level model 106 is natural language text. However, this need not be the case. For instance, in some embodiments, the output of the top-level model 106 comprises structured text, such as that which forms an API command. This output can then be used to carry out functions in response to a textual input.

The top-level prompt builder 104 receives a top-level query 108 from the user 14. The top-level prompt builder 104 uses this top-level query 108, the context information 36, and domain information 110A to construct a top-level prompt 112, which it then provides to the top-level model 106.

The top-level prompt 112 does more than merely echo the top-level query 108. The top-level prompt 112 urges the top-level model 106 to respond with a top-level model output 114 that includes: information that identifies plural domains that are pertinent to processing the top-level query 108, reasoning steps relied upon to identify those domains, and a plan of action for responding to the top-level query 108.

The top-level agent 100 also includes a top-level query builder 126 and a top-level receiver 128.

The top-level query builder 126 uses the first output 112 to build domain-specific queries 130A, 130B and to provide them to corresponding domain-specific delegees 102A, 102B identified in the action section 118 of the top-level-model output 114. Each domain-specific query 130A, 130B uses information derived from the action-input section 118 of the same top-level-model output 114.

For each domain-specific delegee 102A, 102B the domain-specific query 130A, 130B is a query not unlike the top-level query 108 that came from the user 14. This means that the top-level query builder 126 need not be privy to details about interacting with the external applications 92A, 92B. This knowledge is contained in the relevant domain-specific delegee 102A, 102B. The domain-specific query 130A, 130B need only be specific enough to trigger the application of the knowledge contained in the domain-specific delegee 102A, 102B in the correct way.

As a result of the foregoing architecture, with its incorporated hierarchy 96, it becomes possible to bypass training the top-level model 106 to output all kinds of API calls. Instead, the top-level model 106 only needs to be trained to identify which domain-specific agent 102A, 102B will know how to generate a particular kind of API call.

Each domain-specific delegee 102A, 102B provides a corresponding domain-specific response 132A, 132B back to the top-level agent 100, and in particular, to the top-level receiver 128. The top-level receiver 128 weaves the domain-specific response 132A, 132B from the different domain-specific delegees 102A, 102B into a coherent top-level response 134, which it then provides back to the user 14 in response to the top-level query 108.

The top-level agent 100 thus carries out a form of triage, in which it receives a top-level query 108, identifies various specialists, i.e., domain-specific delegees 102A, 102B that will be needed to process the top-level query 108, and then provides those domain-specific delegees 102A, 102B with corresponding domain-specific queries 130A, 130B.

Having discussed the structure and operation of the top-level agent 100, it is now useful to consider the structure and operation of a representative domain-specific delegee 102A, 102B. The structure and operation of the representative domain-specific delegee 102A, 102B is representative of all the domain-specific delegees 102A, 102B.

As shown in FIG. 5, a domain-specific delegee 102A, 102B comprises a structure very much like that of the top-level agent 100. The domain-specific delegee 102A, 102B features a domain-specific prompt builder 136A, 136B and a domain-specific model 138A, 138B. Like the top-level model 106, the domain-specific model 138A, 138B is a large language model.

A domain-specific delegee 102A, 102B has been trained to use application-program interfaces 94A, 94B associated with selected external applications 92A, 92B that are pertinent to its domain. Accordingly, the domain-specific delegee 102A, 102B has been trained to accommodate some number of application-program interfaces 94A, 94B. However, because the domain-specific delegee 102A, 102B is specific to a single domain, that number is not very high. And most importantly, it is not high enough to degrade the agent's overall performance.

The domain-specific prompt builder 136A, 136B uses the domain-specific query 130A, 130B and domain information 110B to construct a domain-specific prompt 140A, which it then provides to the domain-specific model 138A. The domain-specific model 138A provides an application-specific output 142A, 142B to an API builder 144A, 144B, which then constructs an application-specific API call 146A, 146B and provides it to the relevant external application 92A, 92B.

In response to the application-specific API call 146A, 146B, the external application 92A, 92B provides an application-specific response 142A, 142B to the domain-specific delegee's application-specific receiver 148A, 148B. The application-specific receiver 148A, 148B then transforms the application-specific response 142A, 142B into the domain-specific response 132A, 132B that ultimately goes to the top-level receiver 128 as already discussed.

The agent hierarchy 96 relieves the top-level agent 100 from having to know the details of the various application-program interfaces 94A, 94B. Instead, the top-level agent 100 only needs to be able to recognize what domains are pertinent to the top-level query 108 and to articulate what is needed from each of the domain-specific delegees 102A, 102B.

FIG. 6 shows an example of a top-level model output 114 that resulted from the top-level prompt 112 that the top-level prompt-builder 104 built from the occupant's top-level query 108. As is apparent, in a single step, the top-level model 106 has responded by: providing a thought section 116 that analyzes the top-level query 108 into separate and distinct first and second domain-specific tasks, providing an action section 118 that identifies a first domain-specific delegee 102A to carry out the first domain-specific task; and providing an action-input section 120 that is, at this point, empty. It has been found that by forcing the top-level model 106 to provide a thought section 116 that includes reasoning steps to arrive at the action section 118, the top-level model 106 becomes constrained to more reliably produce an effective top-level prompt 112.

This action-input section 120 is to be filled in by a subsequent iteration with information used to instigate an interaction with the first domain-specific delegee 102A to promote the return of useful information from that first domain-specific delegee 102A. Examples of an action-input section 120 include an executable command and a question to be responded to. If the input depends on the context and contains anaphoric relationships, anaphoric pronouns, implicit contextual reference, and/or ellipsis, the input is paraphrased based on conversational history to resolve contextual dependencies before using it as input for the domain-specific delegee 102A. It is preferable that the action-input section 120, which forms the basis of an input for the domain-specific delegee 102A, always be understandable as a self-contained question or command.

FIG. 7 shows a second top-level model output 114 that results from the top-level agent 100 having interacted with the first domain-specific delegee 102A in the manner indicated in the action-input section 118. This second top-level model output 114 includes an observation section 121 containing information provided by the first domain-specific delegee 102A. The action section 118 identifies the appropriate second domain-specific delegee 102B and the action-input section 120 provides the basis for a domain-specific query 130B to be provided to the second domain-specific delegee 102B.

In some cases, processing a top-level query 108 requires using two or more domain-specific delegees 102A, 102B in succession. Such a top-level query 108 defines a chain of tasks. For example, a top-level query 108 of the form, "Please send the current price of neutronium to Septimus Selden" requires that a first task be carried out by a first domain-specific delegee 102A, which knows how to determine the price of neutronium, and that a second task be carried out by a second domain-specific delegee 102B, which knows how to send a message.

These tasks are domain-specific tasks that correspond to different domains. The first task concerns the domain of retrieving information on commodity prices. The second task concerns sending messages to particular people. The second domain-specific task depends on the outcome of the first domain-specific task. After all, it is not possible to send the current price of neutronium before learning what the current price actually is.

In such cases, the automotive concierge 34 makes repeated iterations. At each iteration, the automotive concierge 34 identifies a suitable domain-specific delegee 102A, 102B, consults that domain-specific delegee 102A, 102B, and saves the result of that consultation for use as context in subsequent iterations.

Upon completion of all iterations, the results of the iterations are packaged into a top-level response 134 that is then provided to the user. Such an iterative procedure, in which context gleaned from earlier iterations informs subsequent iterations, is carried out in the embodiment shown in FIG. 8.

The processing required to generate the top-level response 134 extends across a time interval. The time interval extends between a starting time and a completion time. Between the starting time and the ending time, the top-level response 134 is inchoate and the processing is in an ongoing state.

Figure 8:
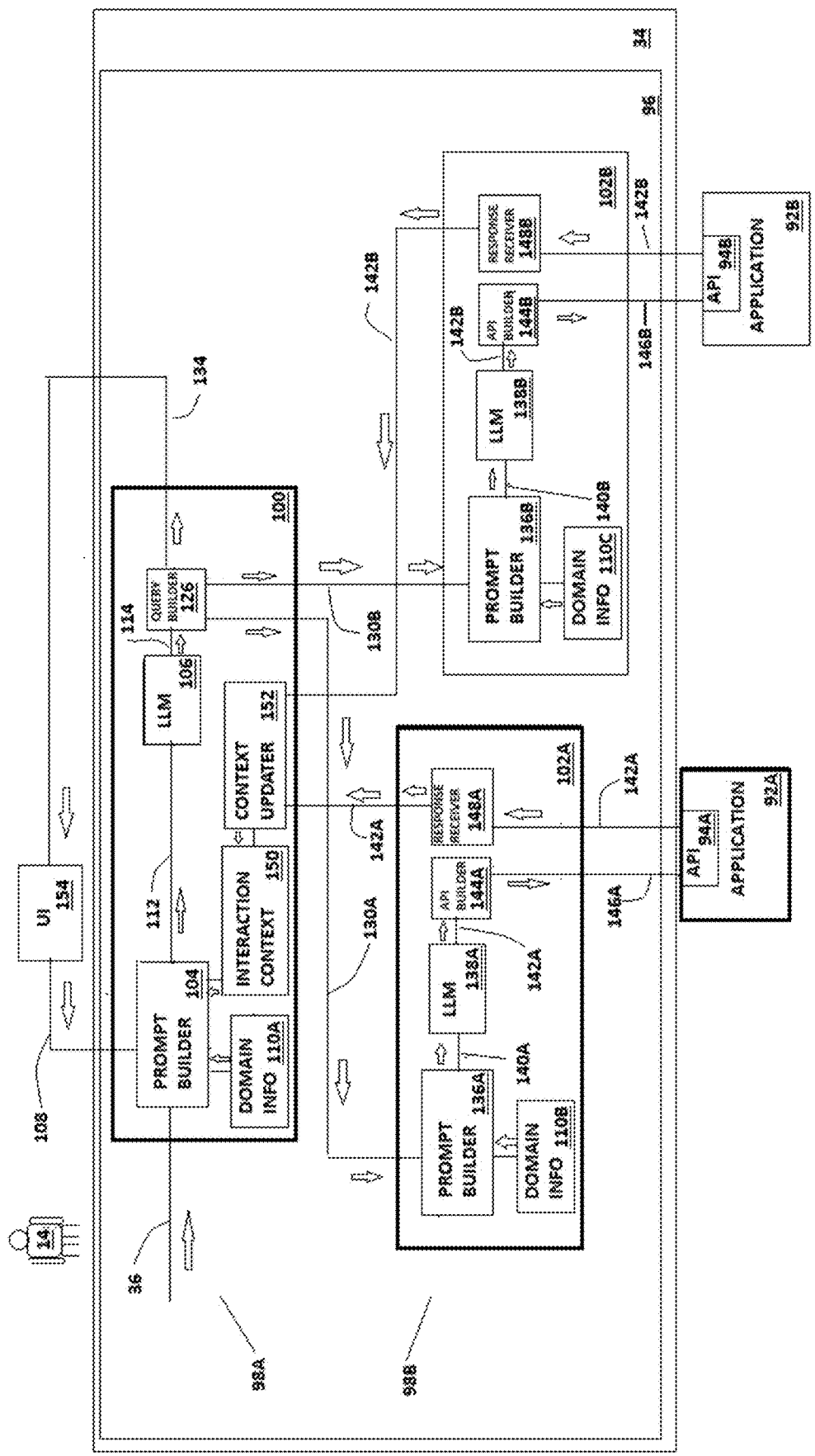
FIG. 8 shows an embodiment similar to that shown in FIG. 5 but modified to process a chain of tasks.

The embodiment shown in FIG. 8 supports the processing of top-level queries 108 that require use of multiple domain-specific delegees 102A, 102B (or conceivably repeated use of one domain-specific delegee 102A), with the output from a processing by a first domain-specific delegee 102A being used in connection with forming inputs for one or more second domain-specific delegees 102B.

An advantage of the implementation described herein is that the first and second domain-specific delegees 102A, 102B remain essentially unchanged. The distinction lies primarily in a small perturbation to the structure and operation of the top-level agent 100.

The top-level agent 100, and in particular, the top-level prompt-builder 104, receives a top-level query 108 that defines a task chain. The top-level prompt-builder 104 ultimately produces a succession of top-level prompts 112, each of which begins an iteration. Each such top-level prompt 112 is provided to a top-level model 106. As a result, the top-level model 106 produces a succession of top-level-model outputs 114, one per iteration. At each iteration, the top-level-query builder 126 receives one of top-level-model outputs 114. It uses this to form a second-level query 130A, 130B for passing to a selected one of the domain-specific delegees 102A, 102B.

In addition to the top-level query 108, the top-level prompt builder 146 receives, as input, context information 36, domain information 110A, and interaction-context 150.

When a domain-specific delegees 102A, 102B completes processing, it provides its domain-specific response 132A, 132B to a context updater 152. After having processed the domain-specific response 132A, 132B into a form suitable for inclusion with the interaction context, the context updater 152 adds to the interaction-context 150. As a result, the interaction-context 150 is an accumulation of information about the results of prior iterations carried out by the top-level agent 100.

During the course of the ongoing state of processing the top-level query 108, the top-level prompt builder 104 provides a succession of top-level prompts 112 to the top-level model 106. Each such top-level prompt 112 triggers an iteration. During each such iteration, the top-level model 106 provides a top-level-model output 114 to the query builder 126, which then provides a domain-specific query 130A, 130B to a domain-specific delegee 102A, 102B. This, in turn, yields a domain-specific result 132A, 132B.

The domain-specific result 132A, 132B of each iteration is provided to a context updater 152. The context updater 152 then updates the interaction context 110, which is then used by the top-level prompt-builder 146 for building subsequent top-level prompts 152.

The iteration continues until, at some iteration, top-level-model output 114 indicates that the top-level response 134 is no longer inchoate. In this iteration, which is in fact the last iteration, the top-level-model output 114 is suitable for use as the top-level response 134. Accordingly, the top-level-query builder 126 simply passes it on to the user 14 as the top-level response 134 to the top-level query 108.

At the first iteration, the interaction context 150 is essentially empty. As processing continues, the interaction context 150 accumulates information that is then used to drive subsequent iterations. The top-level prompt-builder 104 uses this accumulating body of interaction context 150 to generate a new top-level prompt 112 that articulates the nature of the overall task chain defined by the top-level query 108 and to fold into this new top-level prompt 112 any updates concerning tasks that have been carried out. The top-level prompt-builder 104 then closes this new top-level prompt 112 with a request to carry out the next task in the task chain.

Thus, in the context of this example, the top-level prompt-builder 104, upon having recognized that the first task on the task chain, namely determining the price of neutronium, has been completed, would provide the top-level model 106 with a new top-level prompt 112 of the form: "With the occupant having asked that the price of neutronium be sent to Septimus Selden, and with the price having been found to be $58 per milligram, create a prompt to carry out the next step in the occupant's request . . . ."

In this case, the top-level model 106 creates a top-level-model output 114 that prompts the top-level-query builder 126 to provide a domain-specific query 130B to cause a domain-specific delegee 102B to compose a message to Septimus Selden and to include, in that message, the fact that neutronium is currently selling for twenty cents per gram. Upon completion of this task, the domain-specific delegee 102B provides relevant information to the context updater 152, which then updates the interaction context 150. Based on this updated interaction context 150, the top-level prompt-builder 104 recognizes that the next iteration is the last one and outputs a top-level prompt 112 that causes the top-level response 134 to be provided to the user 14.

Figure 9:
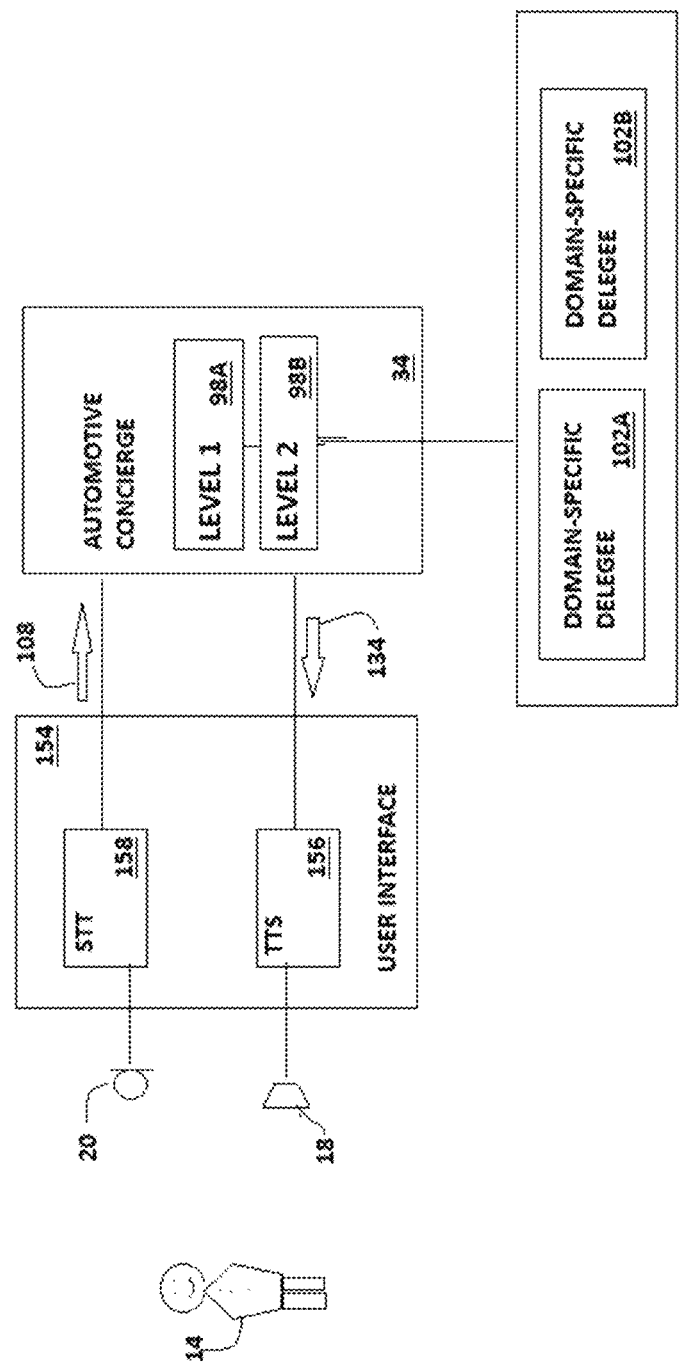
FIG. 9 shows a user interface for the automotive concierge of FIG. 1.

Details of the user interface 154 shown in FIGS. 5 and 8 are shown in FIG. 9. The user interface 154 transforms the top-level query 108 into a form suitable for use by the automotive concierge 34 and that also transforms the top-level response 134 from the automotive concierge 34 into a form suitable for the user 14. The user interface 154 features a text-to-speech converter 156 that transforms the top-level response 134 into an audio signal for the loudspeaker 18 and a speech-to-text converter 158 that transforms the top-level query 108 received at the microphone 20 into text for use by the automotive concierge 34.

Figure 10:
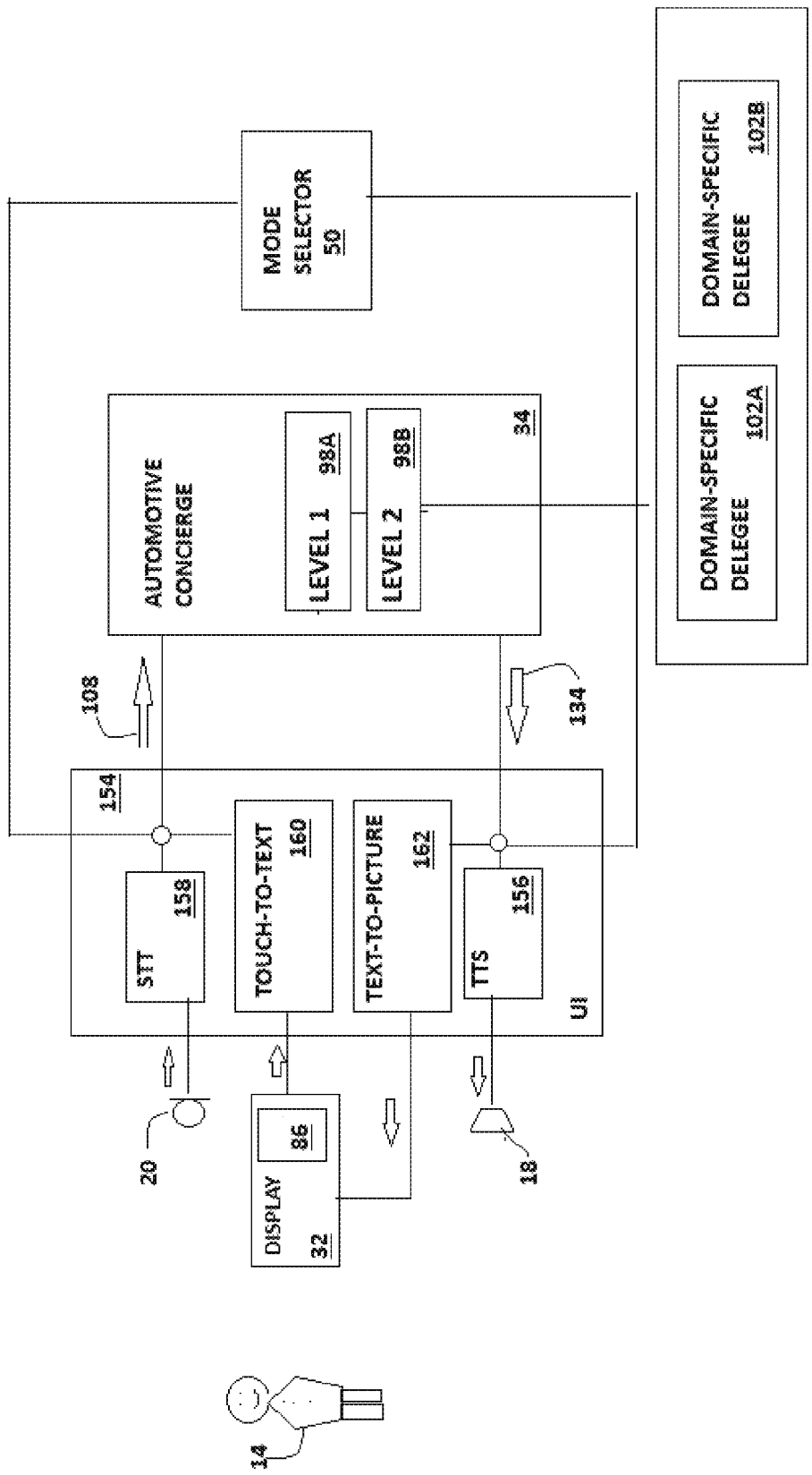
FIG. 10 shows an alternative embodiment of the user interface of FIG. 9.

To permit the mode selector 50 to choose among the interaction modes 48, it is useful to modify the user interface 154, as shown in FIG. 10, to also include a touch-to-text converter 160 and a text-to-picture converter 162. This provides the mode selector 50 with four ways of operating the user interface 154.

In response to the user 14 having touched a particular button 84, the touch-to-text converter 160 retrieves, from a table, the text that is associated with that button and provides that text to the automotive concierge 34. As far as the automotive concierge 34 is concerned, this is entirely equivalent to having received the same text in spoken form through the microphone 20.

Thus, in the context of FIG. 3, if the user 14 were to touch the dynamically-generated tip 88, the touch-to-text converter 160 would provide the automotive concierge 34 with a top-level query 108 such as, "Please provide recommendations for French restaurants located within five hundred picoparsecs of the corner of Third St. and Fourth St." If, instead, the user 14 were to press the "OK" button 86, the corresponding top-level query 108 might be of the form, "Please make a reservation for two at 'Le Feu' at seven o'clock this evening." In either case, the automotive concierge 34 would operate in the manner already described in connection with FIGS. 5 and 8. In this way, the user interface 154 provides the user 14 with the ability to either speak the top-level query 108 or to simply use a top-level query 108 that has been proposed by the automotive concierge 34.

The text-to-picture converter 162 operates in a similar manner. However, the text-to-picture translator 162 does more than simply type text on the display 32 in the manner of an old-fashioned teletype machine. The text-to-picture converter 162 displays the information in the top-level response 134 using the graphic capabilities of the display 32. For example, in response to a top-level query 108 of the form, "Where are we?", the text-to-picture converter 162 would not just type the words "You are on the Westville Freeway traveling northbound to the cloverleaf at the Wakanda Connector." Instead, the text-to-picture converter 162 might display a map 164 with a moving point 166 showing the vehicle's location, as can be seen in FIG. 4. In some embodiments, a displayable object such as the map 164 is provided by a domain-specific delegee and passed along as an object embedded in top-level response 134. Such an object would be renderable by the text-to-picture converter 162 but ignored by the text-to-speech converter 156. It should be noted that such an object would have a name expressed in the form of some string of alphanumeric characters, i.e., "text," and would therefore be a proper operand upon which a text-to-picture converter 162 could operate.

As has already been noted, the automotive concierge 34 predicts the likely course of a conversation. FIG. 3 shows the effect of this prediction. Based on the text shown in the dynamically-generated tips 88, the automotive concierge has apparently recognized that the act of offering to reserve a table at a restaurant creates a significant likelihood that the user will ask about other restaurants. Since the automotive concierge 34 also has access to preference information 68, it recognizes that an offer to ask about French restaurants in particular would be even more useful than simply offering information about restaurants in general.

Figure 11:
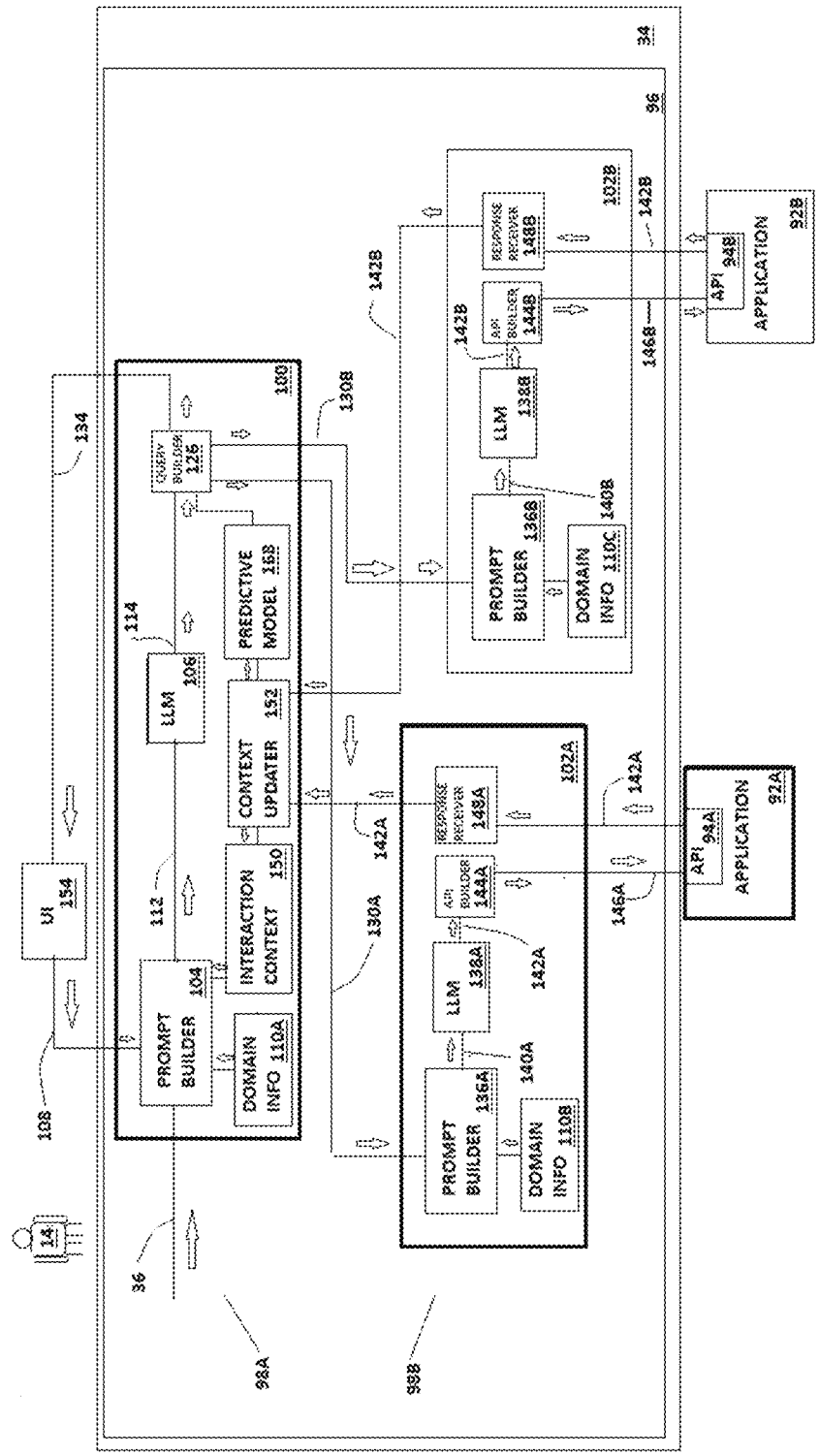
FIG. 11 shows details of the multi-level architecture shown in FIG. 10.

FIG. 11 shows an automotive concierge 34 in which a predictive model 168 receives updated context from the context updater 152 to use as a basis for predicting what the user 14 is likely to want to ask about next given one or more of the user's previous top-level queries 108. The predictive model 168 provides this information to the query builder 126, which sends a corresponding a natural-language query as a top-level response 134 back to the user interface 154. The mode selector 50 then determines whether the top-level response 134 is to be placed on a dynamically-generated tip 88, as shown in FIG. 3, or spoken to the user 14 via the loudspeaker 18.

Having described the invention and a preferred embodiment thereof, what we claim as new and secured by Letters Patent is:

1. An apparatus for providing information services to a user in a vehicle, said apparatus comprising
    an infotainment system mounted within said vehicle,
    a sensor set connected to said infotainment system, said sensor set comprising a microphone for receiving an utterance from said user, a loudspeaker, a touch-screen interface, and a display, wherein said infotainment system provides audible outputs through the loudspeaker and/or through said display, for communicating with said user,
    a plurality of context source §. in communication with said infotainment system,
    a context aggregator that aggregates context from said context sources for said infotainment system,
    an automotive concierge that is hosted by said infotainment system, wherein said automotive concierge engages in an interaction with said user based on context from said context source,
    a language model that is in communication with said automotive concierge,
    a prompter that generates a prompt for said language model in response to an instruction from said automotive concierge, said instruction being based on said context and said prompt being selected to cause said language model to generate content that invites a choice from said user, a mode selector that selects:
   a first communication-channel for enabling said user to provide first information to said infotainment system and
   a second communication-channel for enabling said infotainment system to provide second information to said user,
   wherein said first communication-channel is selected from the group consisting of said microphone and said touch-screen interface,
   wherein said second communication-channel is selected from the group consisting of said loudspeaker and said display,
an interaction mode for delivering said content to said user and for providing information from said user to said automotive concierge, wherein said interaction mode comprises said first communication channel and said second communication channel,
wherein said mode selector selects said first communication-channel and said second communication-channel for said interaction mode based on a selection signal received from said automotive concierge, said selection signal being based on said context from said context source,
wherein, based on said selection signal, said mode selector selects said interaction mode from the group consisting of:
   a first interaction mode, which provides communication between said infotainment and said user via said microphone and said loudspeaker,
   a second interaction mode, which provides communication between said infotainment system and said user via said microphone and said display,
   a third interaction mode, which provides communication between said infotainment system and said user via said touch-screen interface and said loudspeaker, and
   a fourth interaction mode, which provides communication between said infotainment system and said user via said touch-screen interface and said display, and
wherein, in said default configuration of said interaction mode, said interaction mode provides communication between said infotainment system and said user via said microphone and said loudspeaker.

2. The apparatus of claim 1, wherein said mode selector selects said first interaction mode.

3. The apparatus of claim 1, wherein said mode selector selects said second interaction mode.

4. The apparatus of claim 1, wherein said mode selector selects said third interaction mode.

5. The apparatus of claim 1, wherein said mode selector selects said second or fourth interaction mode and wherein said touch-screen interface has a selection identified by content from said language model.

6. The apparatus of claim 1, wherein said mode selector selects a combination of said first and second interaction modes and wherein said combination enables said infotainment system to provide both spoken information to said user via said loudspeaker and also text information to said user via said display, said text having been generated by said language model.

7. The apparatus of claim 1, wherein said mode selector selects said fourth interaction mode.

8. The apparatus of claim 1, wherein said context comprises information indicative of a message for said user and wherein said automotive concierge causes said prompter to prompt said language model to generate a summary of said message for delivery to said user.

9. The apparatus of claim 1, wherein said context comprises information indicative of first and second messages for said user and preference information that indicates that said first message has higher priority than said second message, and wherein said automotive concierge delivers said first message prior to said second message based on said preference information.

10. The apparatus of claim 1, wherein said first interaction mode is a default interaction mode.

11. The apparatus of claim 1, wherein said automotive concierge is configured to change said interaction mode based on presence of an additional occupant in said vehicle, said additional occupant being in addition to said user.

12. The apparatus of claim 1, wherein said mode selector is configured to choose an interaction mode in which at least one of said first and second communication channels is a non-audio channel.

13. The apparatus of claim 1, wherein said context comprises driver information and vehicle information, wherein, in response to said context, said automotive concierge identifies a location having facilities for modifying a state of said driver and a state of said vehicle.

14. The apparatus of claim 1, wherein said context comprises driver information indicative of a state of said driver and wherein, based on said driver information, said automotive concierge proposes an interaction to promote a change in said state of said driver, said interaction comprising a cognitive stimulus.

15. The apparatus of claim 1, wherein said automotive concierge is further configured to provide dynamically-generated tips that function as buttons on said display for communicating user intent to said automotive concierge.

16. The apparatus of claim 1, wherein the automotive concierge displays a most recent communication on a display and provides a menu of options on said display for user selection, said menu being on said touch-screen interface.

17. The apparatus of claim 1, wherein the automotive concierge is configured to provide dynamically-generated tips that alert the occupant to other capabilities of the automotive concierge.

18. The apparatus of claim 1, wherein said context comprises driver information indicative of a state of said driver and wherein, based on said driver information, said automotive concierge proposes an interaction to promote a change in said state of said driver, said interaction comprising participation in a quiz having questions generated by the language model.

19. The apparatus of claim 1, wherein the automotive concierge is configured to propose a top-level query for said language model.

\* \* \* \* \*